(12) United States Patent
Michaelis et al.

(10) Patent No.: US 9,800,731 B2
(45) Date of Patent: Oct. 24, 2017

(54) METHOD AND APPARATUS FOR IDENTIFYING A SPEAKER

(75) Inventors: Paul Roller Michaelis, Louisville, CO (US); David S. Mohler, Arvada, CO (US)

(73) Assignee: Avaya Inc., Basking Ridge, NJ (US)

(*) Notice: Subject to any disclaimer, the term of this patent is extended or adjusted under 35 U.S.C. 154(b) by 545 days.

(21) Appl. No.: 13/486,908

(22) Filed: Jun. 1, 2012

(65) Prior Publication Data
US 2013/0321133 A1 Dec. 5, 2013

(51) Int. Cl.
*H04Q 5/22* (2006.01)
*H04M 3/56* (2006.01)

(52) U.S. Cl.
CPC ........ *H04M 3/569* (2013.01); *H04M 2201/41* (2013.01); *H04M 2203/6045* (2013.01); *H04M 2250/04* (2013.01)

(58) Field of Classification Search
CPC .......................... G06K 19/07749; H04M 3/56
See application file for complete search history.

(56) References Cited

U.S. PATENT DOCUMENTS

| | | | |
|---|---|---|---|
| 6,826,159 B1 | 11/2004 | Shaffer et al. | |
| 7,460,656 B2* | 12/2008 | Lam | 379/202.01 |
| 7,783,022 B1 | 8/2010 | Jay et al. | |
| 2003/0231746 A1 | 12/2003 | Hunter et al. | |
| 2007/0139199 A1* | 6/2007 | Hanlon | 340/572.1 |
| 2008/0101576 A1* | 5/2008 | Vernick | 379/202.01 |
| 2009/0189739 A1 | 7/2009 | Wang | |
| 2011/0135102 A1* | 6/2011 | Huang et al. | 381/58 |
| 2013/0017780 A1* | 1/2013 | Rose et al. | 455/41.1 |

* cited by examiner

*Primary Examiner* — Brian Zimmerman
*Assistant Examiner* — Thomas McCormack
(74) *Attorney, Agent, or Firm* — Sheridan Ross P.C.

(57) ABSTRACT

Systems and methods for identifying a participant providing audible information during a communication session are disclosed. More particularly, speech localization is utilized to determine a location of the participant providing audible information. An identification device determined to be at a location corresponding to the location of the participant providing audible information is identified. The identity of the participant providing the audible information is then obtained by mapping the identification device to the participant. The information identifying the participant providing audible information can be provided to other endpoints of the communication session.

19 Claims, 3 Drawing Sheets

METHOD AND APPARATUS FOR IDENTIFYING A SPEAKER

FIELD

Systems and methods for identifying a speaker participating in a communication session are provided.

BACKGROUND

During a multi-party teleconference, it is desirable to provide an indication of the identity of the person who is currently speaking. This is easily managed when each participant has his or her own individual communication device. For example, the "caller ID" or similar identifier of the speaker's communication device can be used to provide an indication to other participants of the speaker's identity.

A problem arises when two or more people share an endpoint device, such as a speakerphone, as is commonly found in a conference room. In such a situation, audible information received from any of the participants using the shared device can at best provide an indication that the speaker is associated with the conference room device. However, there will be no indication of which individual in particular is providing input through that conference room device.

Proposed techniques for identifying the speaker in a conference room situation include "voice print" identification and visual determination of the speaker. For example, voice recognition and facial recognition can be applied. However, such solutions are expensive to implement, and typically have slow response times.

SUMMARY

Systems and methods for identifying a user or party providing audible information to a communication device are provided. More particularly, a location of the party providing audible information relative to a communication device is determined using voice localization. The identity of the party providing audible information is determined by identifying an identification device determined to be at the location of the party providing audible information and mapping that device to information identifying the party providing audible information.

Systems in accordance with the present disclosure include a communication device with a voice or audio localization feature or capability. In addition, the system includes a device detection and localization system. As an example, but without limitation, a voice localization system can include a speaker phone having an array of microphones and a processor, included as part of the speaker phone or as part of an associated computer, capable of determining a location of a party providing audible information relative to the array of microphones. The device detection and localization system can, for example but without limitation, include a radio frequency identification (RFID) reader capable of reading RFID tags carried by or associated with conference call participants in the vicinity of the speaker phone, or a near field communication (NFC) system capable of obtaining identification and location information of NFC tags or devices associated with conference call participants in the vicinity of the speaker phone. The system can additionally include application programming executed by a processor capable of correlating a determined location of a party providing audible information to a determined location of an identification device, and an identification of the party associated with the identification device.

Methods in accordance with embodiments of the present disclosure include receiving audible information provided by a party at multiple microphones included in a microphone array. Signals comprising the audible information received by the multiple microphones are processed, to determine a relative location of the party providing the audible information. The method further includes determining the location of identification devices in the vicinity of the speaker phone, and identifying an identification device having a location corresponding to the determined location of the party providing audible information. The identity of the party associated with the identification device at the location of the party providing audible information is deemed to be the party providing the audible information. The identity of the party providing audible information can then be delivered to other conference call participants, and/or to feature servers or applications, such as applications operating to record the audible information.

Additional features and advantages of embodiments of the present disclosure will become more readily apparent from the following discussion, particularly when taken together with the accompanying drawings.

DETAILED DESCRIPTION

Figure 1:
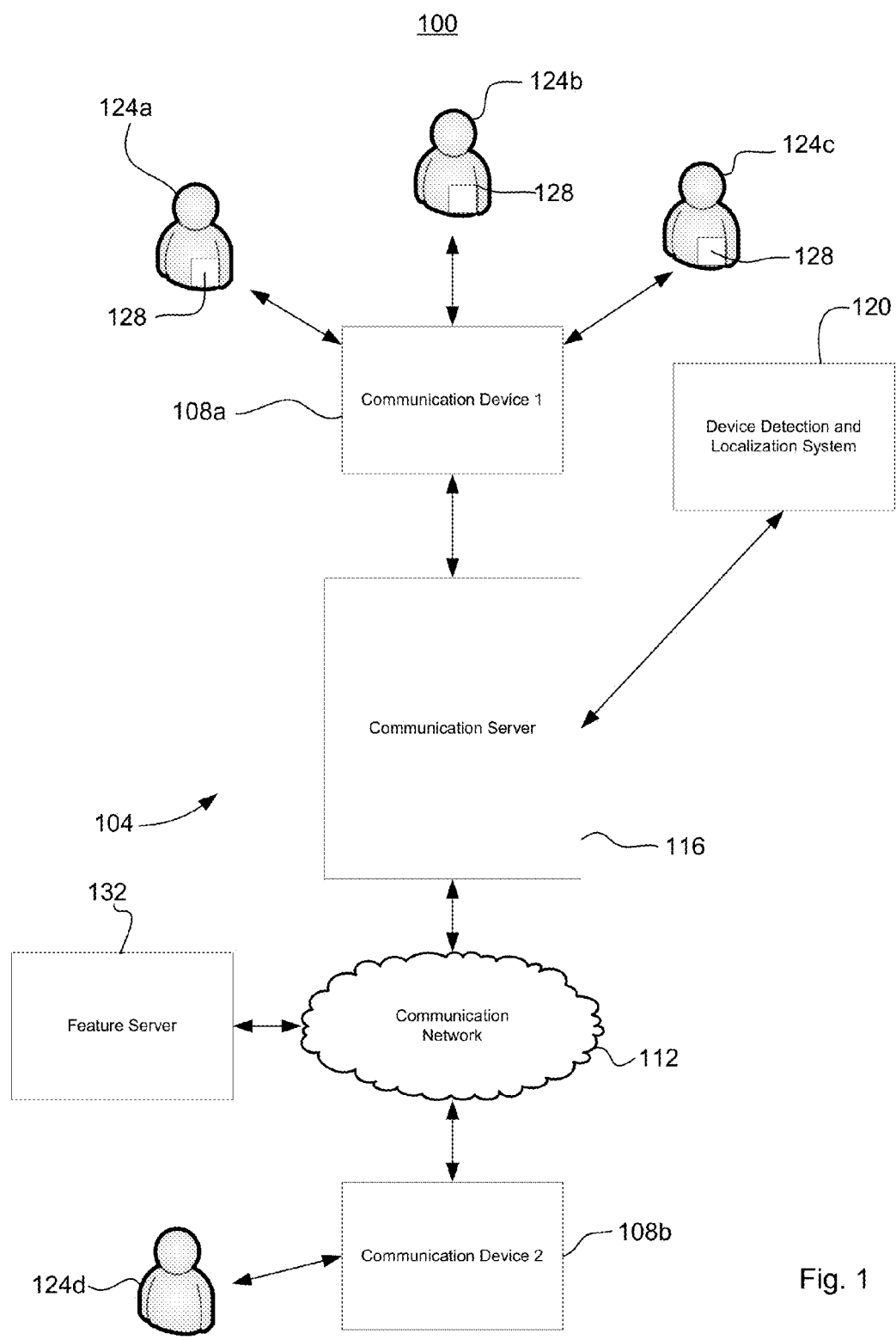
FIG. 1 illustrates components of a communication system in accordance with embodiments of the present disclosure.

FIG. 1 is an illustration of a communication system 100 having a conference call system 104 incorporating speaker identification features in accordance with embodiments of the present disclosure. The communication system 100 generally includes the conference call system 104 and a plurality of communication devices 108. For example, a first communication device 108a can be provided as part of the conference call system 104, and a second communication device 108b can be provided that is capable of communicating with the first communication device 108a via one or more communication networks 112. The communication system 100, and in particular the conference call system 104, can additionally include a communication server 116 and a device detection and localization system 120. Each communication device 108 can be associated with one or more users 124. For example, the first communication device 108a can be associated with a plurality of users 124a-c. Moreover, in this example the second communication device 108b is associated with a single user 124d. However, as can be appreciated by one of skill in the art after consideration of the present disclosure, a communication device 108 can be associated with any number of users 124. Some or all of the users 124 are associated with an identification tag or device 128. The communication system 100 can also include one or more feature servers 132.

A communication device 108 in accordance with embodiments of the present disclosure can comprise any communication device or endpoint capable of supporting audible (e.g., voice) communications in association with one or more users 124. Accordingly, a communication device 108 may comprise a telephone, a speaker phone, a conference room communication system, a cellular telephone, a soft phone, or the like. Moreover, a communication device 108 can support communications that are other than audible communications. For example, a communication device 108 can provide video phone, instant messaging, short message system, email, or other communication capabilities.

The communication devices 108 are generally capable of communicating with one another, or with other communication devices or sever devices, across the communication network 112. The communication network 112 may comprise a packet data network, such as a local area network (LAN) and/or a wide area network (WAN). Alternatively or in addition, the communication network 112 may comprise a dedicated connection between two or more communication devices 108. In accordance with still other embodiments, the communication network 112 may comprise a circuit based communication network, such as the public switched telephony network (PSTN). Furthermore, the communication network 112 may include any number of different network types in various configurations. Moreover, the network 112 can use a variety of protocols, alone or in combination, such as Ethernet, Internet Protocol (IP), session initiation protocol (SIP), integrated services digital network (ISDN), and the like.

The communication server 116 may comprise a general purpose computer or server capable of providing various services or functions in connection with the operation of one or more of the communication devices 108. In an exemplary embodiment, the communication server 116 may comprise an enterprise telecommunications server providing conference bridge, private branch exchange (PBX), sequenced application, or other services, in addition to operating in connection with the identification of a user or party 124 providing audible information or input as described herein. Moreover, the communication server 116 may be incorporated into and/or may comprise a communication device 108.

The device detection and localization system 120 may comprise sensors for detecting identification tags or devices 128 associated with individual users or parties 124 associated with the conferencing system 104. In addition, the device detection and localization system 120 can include sensors and/or programming for determining the location of user identification tags 128. In accordance with further embodiments, the device detection and localization system 120 can include or have access to a database or other store of information correlating information identifying particular user identification devices 128 with information about the associated user 124. Alternatively or in addition, a database or store of such correlating information can be established by a related or a separate device or system that is accessible to the device detection and localization system, such as on a communication server 116 or a feature server 132. As a particular example, the device detection and localization system 120 can comprise a radio frequency identification (RFID) reader or set of readers. As another example, the device detection and localization system 120 can comprise a short range radio communication system, including but not limited to near field communications (NFC), Bluetooth, Wi-Fi, or other radio frequency transmitters. As yet another example, the device detection and localization system can comprise an optical scanner. The device detection and localization system 120 can read identifying information from the identification device 128 associated with a user 124, and can determine the relative location of that identification device 128. The information read by the device detection and localization system 120 from the identification device 128 can include an identification of the associated user 124 by name, employee number, and/or other information. Alternatively or in addition, the information read by the device detection and localization system 120 from the identification device 128 can include a unique identifier, which can then be used by the device detection and localization system 120 to access a database from which additional information regarding the associated user 124 can be obtained.

In general, the system 100 supports communications between users 124. In particular, the system 100 operates to identify a user or party 124 providing audible information to an associated communication device 108. Moreover, the system 100 can function to deliver such audible information and/or information identifying the user 124 to another communication device 108 and in turn to an associated user 124, and/or to another communication node, such as the communication server 116 or a feature server 132 for the application or performance of various services, including but not limited to voice recording, text to speech, or other services. In particular, at least some of the users or parties 124 using a communication device 108 included in the conferencing system 104 are associated with an identification device 128. As an example, an identification device 128 can comprise an identification tag containing identification information that can be read by the device detection and localization system 120. In addition or as an alternative to a unique identifier, the identification device 128 may comprise a store or record of information identifying an associated user 124. In an exemplary embodiment, the user identification device 128 may comprise a radio frequency identification (RFID) tag that can be read by an RFID reader included in the device detection and localization system 120. As a further example, an identification device 128 may comprise a bar code, quick response (QR) code, or other optically readable identifying information. As yet another example, an identification device 128 may comprise or be provided as part of a personal communication device, such as a cellular telephone, tablet computer, laptop computer, or other device carried by an associated user 124 capable of communicating with the device detection and localization system 120 using various means, including but not limited to near field communications (NFC), Bluetooth, Wi-Fi, or the like. Where the identification device 128 is provided as part of a personal communication device, information providing a unique identification associated with the personal communication device and/or the user 124 associated with the identification device 128 can be stored in memory, for example that is provided as part of the personal communication device. Alternatively or in addition, the identification device 128 may comprise a unique identifier, and that unique identifier can be used as an index to information identifying an associated user or party 124 by name and/or other information related to that user or party 124. In addition to being uniquely identifiable, the location of the identification device 128 can be determined by the device detection and localization system 120. For example, the device detection and localization system 120 can include a plurality of sensors that can be operated to determine through triangulation a relative location of an identification device 128. As yet another example, the device detection and localization system 120 can determine a location of an identification device 128 through proximity to a sensor associated with the device detection and localization system 120.

Figure 2:
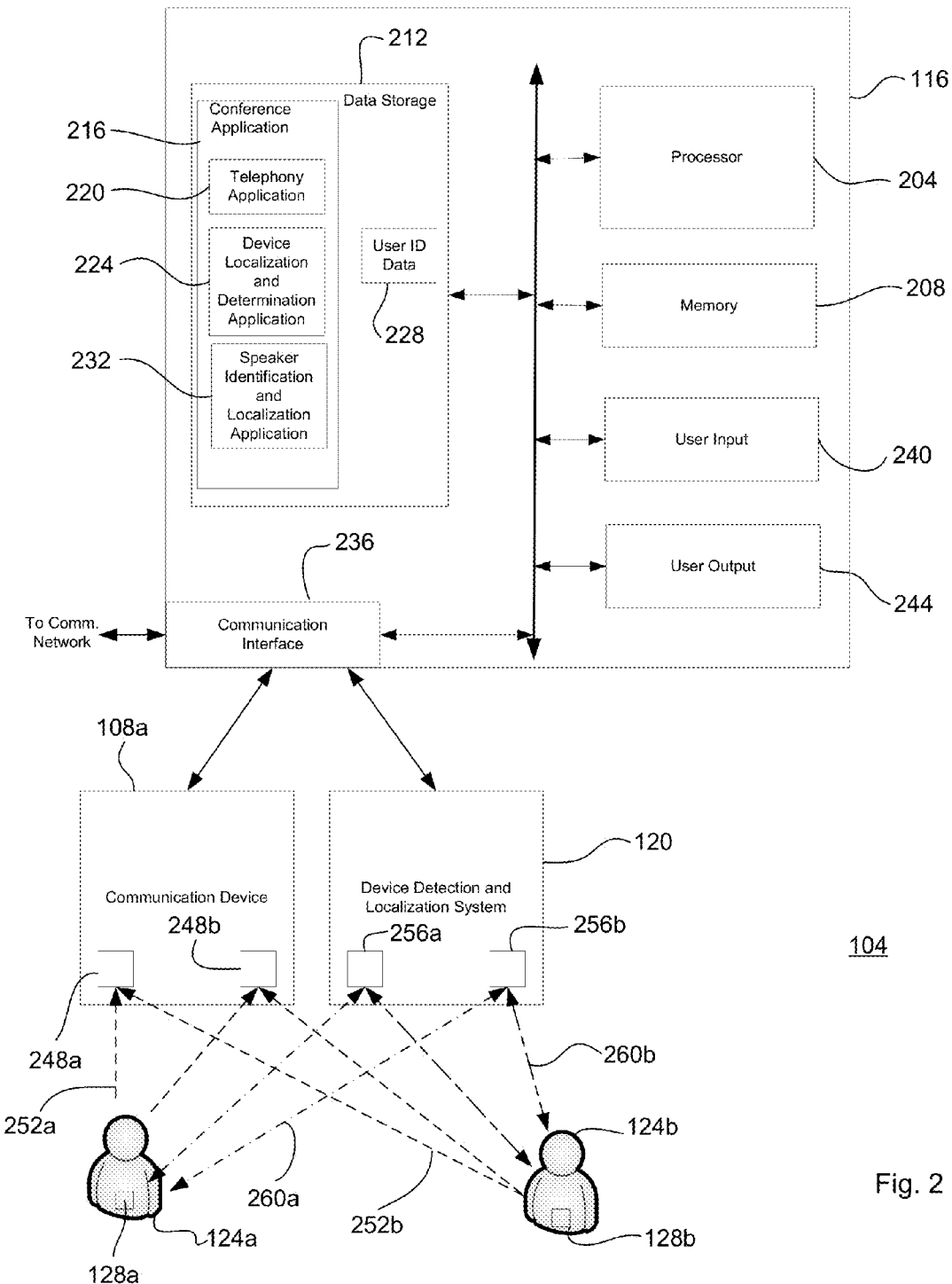
FIG. 2 depicts components of a conferencing system with speaker identification features in accordance with embodiments of the present disclosure.

FIG. 2 illustrates additional aspects of a conferencing system 104 in accordance with embodiments of the present disclosure. In general, the communication server 116 may be implemented, at least partially, as a conventional computing device. Accordingly, the communication server 116 generally includes a processor 204 capable of executing program instructions. The processor 204 may include any general purpose programmable processor or controller for executing application programming. Alternatively, the processor 204 may comprise a specially configured application specific integrated circuit (ASIC). The processor 204 generally operates to run programming code implementing various functions performed by the associated communication server 116 and/or associated devices or systems, including but not limited to a communication device 108 and/or a device detection and localization system 120. For example, the processor 204 can implement functions supporting voice and/or multimedia communications in association with an integrated or an interconnected communication device 108. Moreover, such functions can include the determination of a location of a user or party 124 providing audible information to a communication device 108. As another example, the functions can include the determination of a location of a user identification device 128 and the identification of a user 124 associated with a user identification device 128 in cooperation with signals provided by the device detection and localization system 120.

The communication server 116 additionally includes memory 208. The memory 208 can be used in connection with the execution of programming by the processor 204, and for the temporary or long term storage of data and/or program instructions. As examples, the memory 208 may comprise a computer readable medium, such as RAM, SDRAM, or other solid state memory. Alternatively or in addition, data storage 212 may be provided. In accordance with embodiments of the present disclosure, the data storage 212 can contain programming code or instructions implementing various of the applications or functions executed or performed by the communication server 116. Like the memory 208, the data storage 212 may comprise a computer readable memory, such as RAM, SDRAM, or other solid state memory. Alternatively or in addition, the data storage 212 may comprise a computer readable medium such as a hard disk drive or other random access memory.

In accordance with embodiments of the present disclosure, the data storage 212 can include various applications and data. For example, the data storage 212 can include a conference application 216, the execution of which by the processor 204 implements various conference call functions, including the creation or generation of an output signal that identifies a user or party 124 associated with an audible signal received by a communication device 108 as described herein. The conference application 212 can include various sub-applications or modules. For example, the conference application 216 can include a telephony application or module 220. The telephony application 220 can generally operate to support voice communications between communication devices 108. Alternatively or in addition, the telephony application 220 can comprise a video telephony application, to support the exchange of multimedia communication streams between communication endpoints 108. A device localization and determination application or module 224 can also be included in the conference application 216. The device localization and determination application 224 generally operates to control and/or provide support for operations of an associated device detection and localization system 120. For example, the device localization and determination application 224 can operate to determine a unique identifier and/or information identifying a user 124 associated with an identification device 128 from signals received by the device detection and localization system 120 from that identification device 128. In addition, the device localization and determination application 224 can be provided with signals obtained by the different sensors associated with the device detection and localization system 120, to determine a location of an identification device 128 relative to the device detection and localization system 120. A speaker identification and localization application or module 232 can also be included as part of the conference application 216. The speaker identification and localization application 232 can operate to receive signals from microphones included in an array provided by or associated with a communication device 108 comprising a speaker phone that can be operated in connection with the conference call system 104 to determine a location of a user 124 providing audible information relative to the communication device 108. User identification data 228 can also be maintained in data storage 212. User identification data 228 can provide information linking a particular identification device 128 to a particular user 124, for example where the identification device 128 provides only a unique identifier, and/or limited information identifying an associated user 124.

The communication server 116 can additionally include a communication interface 236. The communication interface can operate to interconnect the communication server 116 to the communication network 112, one or more communication devices 108, and one or more device detection and localization systems 120 or other system components. Moreover, such interconnections can be through a single port, such as an Internet protocol (IP) port, and/or through multiple ports or interfaces. The communication server 116 can additionally include a user input device 240, such as a keyboard, microphone, mouse, or other input device, and a user output 244, such as a display, speaker, or other output device.

A communication device 108 included as part of the conference call system 104 can incorporate or be associated with a plurality of microphones 248. For example, the microphones 248 may comprise a microphone array. Moreover, the array may include two or more microphones 248. As can be appreciated by one of skill in the art after consideration of the present disclosure, the relative time of arrival of an audible signal 252*a* associated with a first user 124*a* having a first location relative to the communication device 108 will have different relative times of arrival at the first 248*a* and second 248*b* microphones as compared to the times of arrival of a second audible signal 252*b* provided by a second user 124*b* having a second location relative to the communication device 108. Although relative times of arrival at different microphones 248 can be used to determine a relative location, other techniques can also be used. For example, a microphone array 252 can be operated in a directional mode, and the relative location of the user 124 providing audible information can be determined through triangulation of the determined direction with respect to multiple directional microphones 248.

A device detection and localization system 120 can include multiple sensors 256 that are capable of reading and/or communicating with identification devices 128 associated with users 124. As examples, the sensors 256 can comprise radio frequency identification device readers capable of obtaining identification data from passive identification tags 128, or sensors 256 capable of receiving actively transmitted identification signals from active identification devices 128. As still other examples, the sensors 256 can comprise optical readers. The sensors 256 can provide information regarding the relative location of an identification device 128 through triangulation and/or proximity determinations. For example, different arrival times of different signals 260*a* and 260*b* received at the sensors 256 from the different identification devices 128*a* and 128*b* in the vicinity of the device detection and localization system 120 can be determined through triangulation. As another example, an amplitude of a signal received from an identification tag 128 can be used to determine a relative proximity of the identification tag 128 to individual sensors 256. In accordance with still other embodiments, a location of a sensor 256 receiving a relatively strong signal from an identification device 128 can be used as the location of the user 124 associated with the identification device 128. As still another example, a user 124 can scan their identification device 128 using a sensor or reader 256 associated with the user's 124 location.

Figure 3:
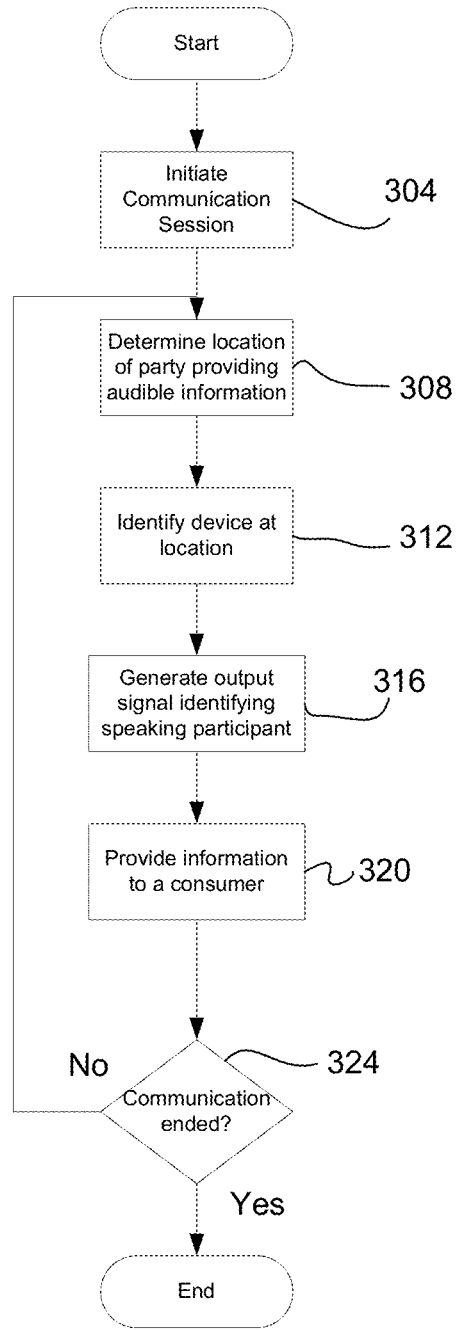
FIG. 3 is a flowchart depicting aspects of a method in accordance with embodiments of the present disclosure.

With reference now to FIG. 3, aspects of the operation of a system in accordance with embodiments of the present disclosure are illustrated. Initially, at step 304, a communication session is initiated, and at step 308, the location of a call participant, party or user 124 providing audible information is determined. More particularly, the location of the user 124 providing audible information relative to a microphone 248 array provided as part of or associated with a communication device 108 included in the communication session is identified. The identification of the relative location of the user 124 providing audible information can be made through the relative times of arrival of the audible information at different microphones 248 included in the array, or through other triangulation techniques. At step 312, an identification device 128 at the location from which the audible information has been determined to originate from is identified. For example, the conference application 216 or modules thereof can operate to identify the identification device 128 that is within or nearest a point or area corresponding to the determined location of the party 124 providing audible information. At step 316, output identifying the user 124 providing audible information is generated. The generation of the identifying information can include the conference application 216 formatting identifying information obtained directly from the identification device 128 at the location corresponding to the location of the party providing the audible information. Alternatively or in addition, generating identifying information can include applying a unique identifier obtained from the identification device 128 at the location determined to correspond to the source of the audible information to a lookup table or database comprising user identification data 228 to obtain such information.

As can be appreciated by one of skill in the art after consideration of the present disclosure, information included in the user identification data 228, if utilized, is generally registered with the system 100 prior to initiation of the conference call. For example, a user 124 can register an identification device 128 associated with the user 124 prior to initiating the call. Such a system could accommodate users 124 from outside an enterprise, for example when signing in as a visitor to an enterprise facility. As another example, a unique identifier associated with an identification device 128 can be used to access a corporate database, for example implemented on or as part of a feature server 132, or other back office application that a device detection and localization system 120 has access to. As yet another example, a telephony based employee lookup or a telephony based lookup based on caller ID information could be used, at least with identification devices 128 comprising mobile telephony communication devices 108 and the like. The information contained in the user identification data 228 could also be entered manually, for example by the user 124 or an administrator. A user can also register with a conference call system 104 using voice recognition technology. For example, a user 124 could register by announcing: "My name is John Smith and my RFID is 123456." Registration can also be semi-automated. For instance, the conference call system 104 could present a prompt "RFID 123456 has been detected in the conference room. Please enter the name of this user." The user 124 or another party in the conference room could then provide the name of the user 124. The identification information could then be stored as at least part of the user identification data 228, and could be presented to a consumer at that same time or later in connection with audible input from that user 124. Examples of unique identifiers include employee identification numbers, telephone numbers, badge numbers, or the like. In particular, any identifier that is unique to an associated user 124, at least for the duration of a communication session, and that is linked to additional information identifying or related to the user 124, that is mapped to the additional information, can be used.

In accordance with still other embodiments, an identification device 128 that is at least temporarily assigned to a user 124 can be integral to a component of the device detection and localization system 120. For example, a user 124 can register as being associated with a predefined location relative to the device detection and localization system 120, for example at a user input device 240, such as a keypad or a card reader, associated with a particular location in a conference facility. As yet another example, an identification device 128 can be virtual, in that a user 124 can register their location relative to the device detection and localization system at or before the initiation of a communication session. Audible information received from that registered location can then be associated with the user 124 who registered as being associated with that location. In addition to user identification data 228 that is local to a communication server 116, user identification data 228 can be stored in the cloud. Accordingly, user identification data 228 need not be enterprise specific. An example of publicly accessible user identification data 228 includes caller identification information commonly utilized as part of the public switched telephony network. As another example, user identification data 228 can be shared between enterprises as part of a federated system.

At step 320, the generated identification information can be provided to a consumer. In accordance with embodiments of the present disclosure, the consumer can include a user 124 at a communication device 108 in communication with the communication device 108 that received the audible information. For example, a message containing the information identifying the party 124 providing the audible information can be presented by the communication device 108 associated with the receiving party 124. Alternatively or in addition, the consumer can comprise a communication server 116, feature server 132, or other device associated or in communication with the conference call system 104. An example of such a device includes a recording service that prepares an audible recording and/or a transcription of the conference call. More particularly, the information identifying the user 124 providing the audible information can be stored as part of the recording or transcript.

At step 324, a determination can be made as to whether the communication has ended. If the communication has not ended, the process can return to step 304. Alternatively, the process can end.

In accordance with embodiments of the present invention, a user 124 providing audible information can be identified even in the presence of background noise. Embodiments of the present disclosure can also associate different users 124 with different items or instances of audible information, even when such audible information is provided by the different users 124 simultaneously. Accordingly, for example where a recording or transcription feature is being utilized, different streams of audible information received simultaneously by a communication device 108 can be recorded and can be accurately associated with the different users 124.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A communication system, comprising:
    a plurality of microphones;
    a device detection and localization system comprising, within a same physical housing, a radio frequency identification tag reader;
    a communication server, including:
        memory;
        a processor;
        a conference application stored on the memory and executed by the processor, wherein through execution of the conference application the communication server:
            determines a location of a first party providing first audible information to the plurality of microphones, wherein the location of the first party is determined based on different arrival times of the first audible information at two or more of the plurality of microphones;
            identifies a first identification device at the location of the first party providing the first audible information, wherein the first identification device is a personal communication device of the first party that comprises, in the same physical housing, a radio frequency identification tag, and wherein the first identification device is identified based on a caller ID of the first party and the radio frequency identification tag in the first identification device;
            correlates the caller ID of the first identification device to the first party;
            provides the first audible information as part of a conference call; and
            generates an output signal identifying the first party providing audible information in the conference call.

2. The system of claim 1, further comprising:
    a feature server, wherein the first audible information and the output signal identifying the first party are provided to the feature server.

3. A method for identifying a party to a communication session, comprising:
    receiving, by a processor, a first audible signal at a first communication device;
    determining, by the processor, a location of a source of the first audible signal;
    determining, by the processor, a location of a first identification device, wherein the location of the first identification device is determined based on different arrival times of a signal from the first identification device received at a plurality of sensors;
    determining, by the processor, that the location of the source of the first audible signal corresponds to the location of the first identification device, wherein the first identification device is a personal communication device of the first party that comprises, within the same physical housing, a radio frequency identification tag, and wherein the first identification device is identified based on a caller ID of the first party and the radio frequency identification tag in the first identification device;
    determining, by the processor, an identity of a first party associated with the first identification device based on the caller ID of the first party;
    providing, by the processor, the first audible signal as part of a conference call; and
    generating, by the processor, an output identifying the first party as the party from whom the first audible signal is received in the conference call.

4. The method of claim 3, wherein determining an identity of the first party comprises:
    receiving stored information identifying the first party from the first identification device.

5. The method of claim 4, wherein the stored information is read from the radio frequency identification tag and the location of the radio frequency identification tag is determined by a radio frequency identification reader.

6. The method of claim 4, wherein the first identification device comprises a second communication device, wherein the second communication device comprises a first near field communication system, and wherein the stored information is read from the second communication device and the location of the second communication device is determined using signals passed between the first near field communications system and a second near field communication system.

7. The method of claim 4, wherein the stored information identifying the first party received from the first identification device associated with the first party is applied to access personnel identification data, wherein at least some of the personnel identification data is entered during a registration step and is stored as user identification data, and wherein a name of the first party is obtained from the personnel identification data.

8. The method of claim 4, further comprising:
    receiving a second audible signal at the first communication device;
    determining a location of a source of the second audible signal;
    determining a location of a second identification device;
    determining that the location of the source of the second audible signal corresponds to the location of the second identification device;

determining an identity of a second party associated with the second identification device; and generating an output identifying the second party as the party from whom the second audible signal is received.

9. The method of claim 8, wherein the first and second audible signals are received simultaneously.

10. The method of claim 4, further comprising:

displaying the output identifying the first party as the party from whom the first audible signal is received to a party using a second communication device, wherein the first communication device and the second communication device are participating in an active communication session.

11. A device comprising:

a microprocessor; and a computer readable medium, coupled with the microprocessor and comprising microprocessor readable and executable instructions that cause the microprocessor to execute:

instructions to determine a location of a source of at least first audible information;

instructions to identify an identification device at the location of the source of the first audible information, wherein the location of the identification device is determined based on different arrival times of a signal from the identification device received at a plurality of sensors, wherein the identification device is a personal communication device that comprises, within the same physical housing, a radio frequency identification tag, and wherein the identification device is identified based on a caller ID of the first party and the radio frequency identification tag in the identification device;

instructions to determine an identity of the first party providing the first audible information from the identification device at the location of the source of the first audible information based on the caller ID of the first party;

instructions to provide the at least first audible information as part of a conference call; and instructions to provide a first output signal identifying the first party providing the at least first audible information in the conference call.

12. The device of claim 11, wherein the first party is associated with a first communication device, wherein a second party is also associated with the first communication device, wherein a location of the second party is determined from an identification device associated with the second party, wherein the identity of the second party is determined from the identification device associated with the second party, wherein a location of a source of second audible information is determined, wherein whether the determined location of the second audible information corresponds to the location of the second party is determined, and wherein the second party is identified as the speaking participant in response to determining that the determined location of the source of the second audible information corresponds to the determined location of the second party.

13. The device of claim 12, wherein at least a first portion of the first audible information is received while at least a first portion of the second audible information is received, wherein the identification of the first party as the source of the first audible information is provided as the first output signal and the identification of the second party of as the source of the second audible information is provided as a second output signal simultaneously.

14. The device of claim 12, wherein the first output signal identifying the first party as the party from whom the first audible signal is provided while playing a recording of the first audible signal.

15. The method of claim 3, wherein the first audible signal is part of a conference call between a plurality of parties, wherein the conference call is stored as part of a transcript of the conference call, and wherein the output identifying the first party is part of the transcript of the conference call.

16. The method of claim 3, wherein the first party is a visitor to an enterprise and wherein the identification device is registered when the visitor signs into an enterprise facility.

17. The method of claim 3, further comprising: registering, by a second party using voice recognition, a unique identifier associated with the second party, wherein the second party registers the unique identifier by saying the unique identifier.

18. The method of claim 3, further comprising:

registering, by a second party, using Radio Frequency Identification (RFID), a unique identifier associated with the second party; and in response to the second party registering the unique identifier associated with the second party, prompting for a name of the second party.

19. The method of claim 18, wherein the unique identifier associated with the second party is an RFID tag number and in response to the second party registering the unique identifier associated with the second party, generating a signal that states the RFID tag number to the second party along with prompting for the name of the second party.

* * * * *